United States Patent
Okamoto (10) Patent No.: US 9,676,144 B2
(45) Date of Patent: Jun. 13, 2017

(54) THREE-DIMENSIONAL STRUCTURE MANUFACTURING APPARATUS, METHOD OF MANUFACTURING THREE-DIMENSIONAL STRUCTURE, AND THREE-DIMENSIONAL STRUCTURE

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/662,616

(22) Filed: Mar. 19, 2015

(65) Prior Publication Data

US 2015/0273762 A1 Oct. 1, 2015

(30) Foreign Application Priority Data

Mar. 26, 2014 (JP) ................................. 2014-063433

(51) Int. Cl.
| | |
|---|---|
| *B29C 67/00* | (2017.01) |
| *B33Y 10/00* | (2015.01) |
| *B33Y 30/00* | (2015.01) |
| *B29K 33/00* | (2006.01) |

(52) U.S. Cl.
CPC ...... *B29C 67/0085* (2013.01); *B29C 67/0059* (2013.01); *B33Y 10/00* (2014.12); *B33Y 30/00* (2014.12); *B29K 2033/08* (2013.01); *Y10T 428/31551* (2015.04); *Y10T 428/31938* (2015.04)

(58) Field of Classification Search
CPC . B29C 67/00; B29C 67/0055; B29C 67/0059; B33Y 10/00; B33Y 30/00
USPC ................ 427/487, 359; 264/496, 340, 401; 425/174.4, 374
See application file for complete search history.

(56) References Cited

U.S. PATENT DOCUMENTS

| | | |
|---|---|---|
| 3,732,107 A | 5/1973 | Faust |
| 3,857,885 A | 12/1974 | Faust |
| 4,458,006 A | 7/1984 | Doenges et al. |
| 4,495,271 A | 1/1985 | Geissler et al. |
| 4,530,747 A | 7/1985 | Donges et al. |
| 4,987,053 A | 1/1991 | Gersdorf et al. |
| 5,200,299 A | 4/1993 | Steppan et al. |
| 6,612,824 B2 | 9/2003 | Tochimoto et al. |
| 2013/0228953 A1 | 9/2013 | Ikeda et al. |

FOREIGN PATENT DOCUMENTS

| | | |
|---|---|---|
| JP | 46-027926 A | 8/1971 |
| JP | 48-041708 A | 12/1973 |
| JP | 51-047334 B | 12/1976 |

(Continued)

*Primary Examiner* — Bruce H Hess
(74) *Attorney, Agent, or Firm* — Global IP Counselors, LLP (57) ABSTRACT

A three-dimensional structure manufacturing apparatus, in which the three-dimensional structure is manufactured by laminating layers, includes: a base unit on which a three-dimensional structure is to be formed; a discharge unit which discharges a curable ink onto the base unit; flattening unit which flattens an ink layer composed of the curable ink discharged onto the base unit; and curing unit which cures the ink layer. Here, the ink layer is cured by the curing unit while being flattened by the flattening unit.

6 Claims, 2 Drawing Sheets

(56) References Cited

FOREIGN PATENT DOCUMENTS

| | | | | |
|---|---|---|---|---|
| JP | 54-021726 B | | 8/1979 | |
| JP | 57-196231 A | | 12/1982 | |
| JP | 59-005240 A | | 1/1984 | |
| JP | 59-005241 A | | 1/1984 | |
| JP | 01-165613 A | | 6/1989 | |
| JP | 02-226149 A | | 9/1990 | |
| JP | 2000-280354 A | | 10/2000 | |
| JP | 2010-100054 | * | 5/2010 | ............... B41J 2/01 |
| JP | 2012-096429 A | | 5/2012 | |

* cited by examiner

FIG. 2

THREE-DIMENSIONAL STRUCTURE MANUFACTURING APPARATUS, METHOD OF MANUFACTURING THREE-DIMENSIONAL STRUCTURE, AND THREE-DIMENSIONAL STRUCTURE

BACKGROUND

1. Technical Field

The present invention relates to a three-dimensional structure manufacturing apparatus, a method of manufacturing a three-dimensional structure, and a three-dimensional structure.

2. Related Art

In the related art, for example, a method of forming a three-dimensional structure on the basis of a model of a three-dimensional object formed by three-dimensional CAD software or the like has been known.

As one method of forming a three-dimensional structure, a lamination method is known (for example, refer to JP-A-2000-280354). In the lamination method, generally, a model of a three-dimensional object is divided into a plurality of two-dimensional cross-sectional layers, and then cross-sectional members corresponding to the respective two-dimensional cross-sectional layers are sequentially formed and laminated, thereby forming a three-dimensional structure.

In the lamination method, if only a model of a three-dimensional structure to be formed is present, it is possible to directly form a three-dimensional, and there is no need to fabricate a mold prior to forming. Therefore, it is possible to rapidly and inexpensively form a three-dimensional structure. Further, in the lamination method, thin plate-shaped cross-sectional members are laminated one by one, and thus it is possible to form a three-dimensional structure as an integrated structure without being divided into a plurality of parts even when the three-dimensional structure is a complex body having an inner structure.

Meanwhile, in the method in the related art, plane images obtained by dividing the three-dimensional data of a three-dimensional structure is drawn and laminated by an ink jet method to form a three-dimensional structure. However, when layers are formed by discharging ink using an ink jet method, there is a problem in that the dimensional accuracy of a three-dimensional structure to be finally obtained is lowered due to the variation in thickness of each of the layers.

SUMMARY

An advantage of some aspects of the invention is to provide a three-dimensional structure manufacturing apparatus and a method of manufacturing a three-dimensional structure, by which a three-dimensional structure can be efficiently formed with high dimensional accuracy, and to provide a three-dimensional structure manufactured with high dimensional accuracy.

The invention is realized in the following forms.

According to an aspect of the invention, there is provided a three-dimensional structure manufacturing apparatus, in which the three-dimensional structure is manufactured by laminating layers, including: a base unit on which the three-dimensional structure is to be formed; a discharge unit which discharges a curable ink onto the base unit; a flattening unit which flattens an ink layer composed of the curable ink discharged onto the base unit; and a curing unit which cures the ink layer.

Thus, it is possible to provide a three-dimensional structure manufacturing apparatus for efficiently manufacturing a three-dimensional structure with high dimensional accuracy.

In the apparatus, the curing unit may be an ultraviolet irradiation unit, and may irradiate a contact area between the ink layer and the flattening unit with ultraviolet rays.

Thus, it is possible to efficiently manufacture a three-dimensional structure with high dimensional accuracy.

In the apparatus, the flattening unit may be a roller, and the curing unit may be provided in the roller.

Thus, it is possible to efficiently perform operations of flattening and curing.

In the apparatus, the curing unit may be an ultraviolet irradiation unit, and a light shielding unit may be provided between the curing unit and the discharge unit.

Thus, it is possible to prevent the curable ink discharged from the discharge unit from being involuntarily cured.

In the apparatus, the light shielding unit may include an exhaust unit.

Thus, it is possible to effectively prevent heat or odor from staying in the apparatus.

In the apparatus, the two flattening units and the two curing units may be symmetrically arranged around the discharge unit.

Thus, it is possible to more efficiently form a flat layer.

In the apparatus, the flattening unit may be configured to move in the thickness direction of the ink layer.

Thus, it is possible to easily adjust the thickness of a layer to be formed.

According to another aspect of the invention, there is provided a method of manufacturing a three-dimensional structure, in which the three-dimensional structure is manufactured by laminating layers, including: discharging curable ink to form an ink layer; flattening the ink layer; and curing the ink layer, in which the ink layer is simultaneously flattened and cured.

Thus, it is possible to provide a method of efficiently manufacturing a three-dimensional structure with high dimensional accuracy.

According to still another aspect of the invention, there is provided a three-dimensional structure, which is manufactured using the three-dimensional manufacturing apparatus.

Thus, it is possible to provide a three-dimensional structure manufactured with high dimensional accuracy.

According to still another aspect of the invention, there is provided a three-dimensional structure, which is manufactured by the method of manufacturing a three-dimensional structure.

Thus, it is possible to provide a three-dimensional structure manufactured with high dimensional accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawing.

1. Three-Dimensional Structure Manufacturing Apparatus

First, a preferred embodiment of a three-dimensional structure manufacturing apparatus according to the invention is described.

Figure 1:
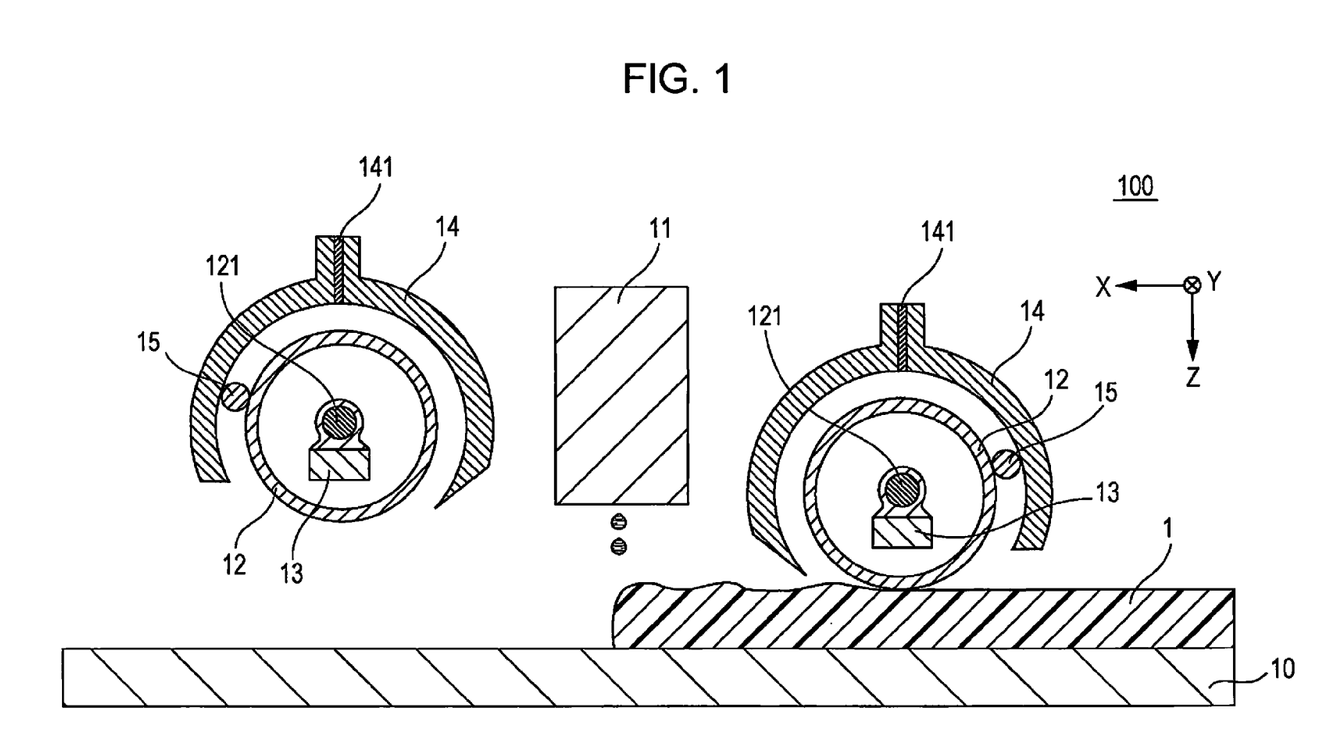
FIG. 1 is a cross-sectional view showing a preferred embodiment of a three-dimensional structure manufacturing apparatus according to the invention.
Figure 2:
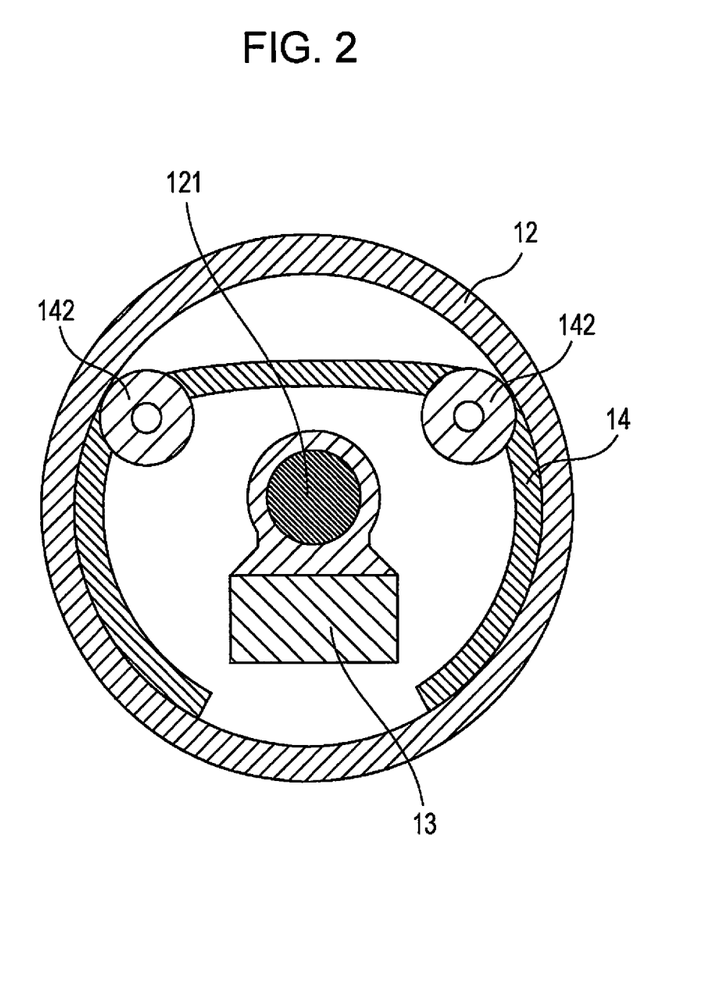
FIG. 2 is a cross-sectional view showing another embodiment of a flattening unit (roller).

FIG. 1 is a cross-sectional view showing a preferred embodiment of a three-dimensional structure manufacturing apparatus according to the invention. FIG. 2 is a cross-sectional view showing another embodiment of a flattening unit (roller).

The three-dimensional structure manufacturing apparatus 100 is a three-dimensional structure manufacturing apparatus by laminating layers (unit layers) 1 formed using curable ink containing a curable resin (curing component).

As shown in FIG. 1, the three-dimensional structure manufacturing apparatus 100 includes: a base unit 10 on which a three-dimensional structure is to be formed; a discharge unit 11 which discharges a curable ink onto the base unit 10; two rollers (flattening unit) 12 which flatten an ink layer composed of the curable ink discharged onto the base unit 10; two ultraviolet irradiation units (curing unit) 13 which cure the ink layer; two light shielding units 14 which prevent the discharge unit 11 from being irradiated with ultraviolet rays; and two washing units 15 each of which washes the surface of each of the rollers 12.

The two rollers 12, two ultraviolet irradiation units 13, two light shielding units 14, and two washing units 15 are symmetrically arranged around the discharge unit 11.

The base unit 10 is an ink layer flattened in the process of laminating ink layers in the forming stage of the three-dimensional structure manufacturing apparatus 100 or in the process of forming the three-dimensional structure. Curable ink is discharged onto the base unit 10 to form a layer 1.

The discharge unit 11 has a function of discharging curable ink onto the base unit 10 while moving in X-axis direction relatively to the base unit 10. The curable ink discharged onto the base unit 10 is formed into an ink layer.

The discharge unit 11 is mounted with a droplet discharge head that discharges the droplets of the curable ink by an ink jet method. In addition, the discharge unit 11 is provided with a curable ink supply unit not shown in FIG. 1. In the present embodiment, a droplet discharge head using a so-called piezoelectric driving method is employed. Further, in the present embodiment, in the discharge unit 11, a line head in which a plurality of droplet discharge heads are arranged in the Y-axis direction is employed. Here, the "line head" refers to a droplet discharge head used in a three-dimensional structure manufacturing apparatus in which a nozzle region formed in the Y-axis direction crossing the X-axis direction is provided to cover the entire base unit 10, and one of the discharge unit 11 and the base unit 10 is fixed and the other one thereof is moved to form the layer 1. Meanwhile, the nozzle region of the line head in the Y-axis direction may not cover the entire base unit 10 in the Y-axis direction corresponding to the three-dimensional structure manufacturing apparatus.

The roller 12 has a function of flattening the ink layer. The roller 12 is configured to move in the X-direction following the discharge unit 11.

The roller 12 is a cylindrical member in which the Y-axis direction is a longitudinal direction, and is configured to be rotatable around a shaft 121.

In addition, the roller 12 is made of a material transmitting light. As the material, silicon, quartz glass, or the like can be used.

Further, the surface of the roller 12 is subjected to liquid-repellent treatment such as fluorine processing, and is configured such that curable ink hardly adheres.

Further, the roller 12 is configured to be rotatable in the Z-axis direction. Thus, it is possible to easily adjust the thickness of the layer 1.

The ultraviolet irradiation unit 13 has a function of curing the curable ink by irradiating the ink layer with ultraviolet rays.

As the ultraviolet irradiation unit 13, a low-pressure mercury lamp, a metal halide lamp, an ultraviolet light-emitting diode (LED), or the like is employed. Particularly, an ultraviolet light-emitting diode (LED) is preferably employed in terms of small size, heat generation during irradiation, generation of ozone, power consumption, lifetime, and the like.

The ultraviolet irradiation unit 13 is provided in the roller 12. Specifically, the ultraviolet irradiation unit 13 is hung on the shaft 121 of the roller 12, and is configured to irradiate the contact area between the ink layer and the roller 12 with ultraviolet rays regardless of stop and rotation of the roller 12. For example, an ultraviolet light-emitting diode (LED) is preferably used to irradiate the contact area because the light emitted therefrom has strong straightness (directivity) and hardly diffuses.

The light shielding unit 14 has a function of preventing the ultraviolet rays emitted from the ultraviolet irradiation unit 13 from moving toward the discharge unit 11. The light shielding 14 is provided to cover the ultraviolet irradiation unit 13, and is opened toward the ink layer.

In addition, the light shielding unit 14 has an exhaust unit 141. The exhaust unit 141 has a function of preventing heat or odor from staying in the three-dimensional structure manufacturing apparatus 100 structure.

The washing unit 15 has a function of removing the curable ink adhering to the surface of the roller 12.

Further, the washing unit 15 has a function of imparting a liquid repellent agent to the surface of the roller 12 to prevent the adherence of the curable ink, in addition to the above removing function.

This three-dimensional structure manufacturing apparatus 100 is configured to cure the ink layer by the ultraviolet irradiation unit (curing unit) 13 while flattening the ink layer by the roller (flattening unit) 12. Thus, it is possible to effectively flatten the layer 1 while preventing the involuntary loss of curable ink. In contrast to this, when the flattening is performed without the irradiation of ultraviolet rays, the curable ink is lost, and thus it is impossible to form a layer 1 having desired thickness. Further, when the flattening is performed after completely cured, it is impossible for the ink layer to be sufficiently flattened.

In the three-dimensional structure manufacturing apparatus 100 according to the present embodiment, the two rollers 12, two ultraviolet irradiation units 13, two light shielding units 14, and two washing units 15 are symmetrically arranged around the discharge unit 11. With this configuration, the layer 1 can be bi-directionally (left and right) formed in the X-axis direction, and thus the production efficiency of the three-dimensional structure can be improved.

In addition, in the case of this symmetrical structure, while the flattening is performed by one of the rollers 12, the other roller 12 is waiting over the layer 1 (in the direction away from the layer 1). Meanwhile, the three-dimensional structure manufacturing apparatus 100 may be configured such that, during the waiting, from the ultraviolet irradiation unit 13 in the other roller 12, ultraviolet rays are applied to a layer 1 located under the layer 1 which is currently forming by one step, thereby completely curing the curable ink in the layer 1.

In the above description, a case where the ultraviolet irradiation unit 13 is used as a curing unit for curable ink has been described, but the invention is not limited thereto, and a heating unit for curing curable ink by heating may also be used. An example of the heating unit includes an infrared lamp.

Further, in the above description, a configuration where the light shielding unit 14 covers the roller 12 has been described, but the invention is not limited thereto, and, for example, as shown in FIG. 2, a configuration where the light shielding unit 14 is provided in the roller 12 may also be employed. In FIG. 2, the light shielding unit 14 is configured to be always opened toward the ink layer by two rotators 142. In addition, a reflective layer may be provided in the light shielding unit 14 to reflect ultraviolet rays or infrared rays. In this case, for example, a configuration where ultraviolet rays emitted from the ultraviolet irradiation unit 13 are applied toward the reflective layer and the reflected ultraviolet rays are applied to the contact area between the roller 12 and the ink layer may also be employed.

In the above description, a configuration where two rollers 12, two ultraviolet irradiation units 13, two light shielding units 14, and two washing units 15 are provided has been described, but they may be provided one by one.

Further, a case where the roller 12 is used as a flattening unit has been described, but a flat plate may be used as the flattening unit.

2. Method of Manufacturing Three-Dimensional Structure

First, the method of manufacturing a three-dimensional structure according to the invention is described.

The method of manufacturing a three-dimensional structure according to the present embodiment, in which the three-dimensional structure is manufactured by laminating layers 1, includes the processes of: discharging curable ink to form an ink layer; flattening the ink layer; and curing the ink layer.

Hereinafter, the method of manufacturing a three-dimensional structure will be described with reference to the above-mentioned three-dimensional structure manufacturing apparatus 100 as an example.

First, the discharge unit 11 applies curable ink onto the base unit 10 while moving in the right direction in FIG. 1 to form an ink layer.

Next, the ink layer is flattened by the roller 12 (right roller 12 in FIG. 1) moving following the discharge unit 11, and simultaneously the contact area between the roller 12 and ink layer is irradiated with ultraviolet rays from the ultraviolet irradiation unit 13 to form a layer 1. In this case, the layer 1 may be completely cured, and may not be completely cured (temporarily cured). In the case where the layer 1 is not completely cured (temporarily cured), the layer 1 can be completely cured by irradiating this layer 1 with ultraviolet rays again at the time of moving in the left direction in FIG. 1 to form a layer 1. Here, the case that the layer 1 is not completely cured (temporarily cured) refers to the case that the surface of the ink layer is not fluidized after the ink layer is flattened by the roller 12.

In addition, the contact area and the ultraviolet irradiation area may not be exactly matched. For example, the ultraviolet irradiation area may be smaller than the contact area. Even when the ultraviolet irradiation area becomes somewhat larger than the contact area, in the contact area, the ink layer can be fluidized, flattened by the roller 12, and temporarily cured such that the surface of the ink layer is not fluidized. Next, after one layer 1 is formed, the discharge unit 10 moves in the left direction in FIG. 1 to form another ink layer, and this layer is flattened by the left roller 12 in FIG. 1 and simultaneously cured by the ultraviolet irradiation unit 13 to form a second layer 1.

By repeating these operations, it is possible to obtain a three-dimensional structure in which layers 1 are laminated.

3. Curable Ink

The curable ink contains at least a curable resin (curing component).

Curable Resin

Examples of the curable resin (curing component) include: thermosetting resins; various photocurable resins such as visible light curable resin cured by light in the visible light region (narrowly-defined photocurable resin), ultraviolet curable resin, and infrared curable resin; and X-ray curable resins. They can be used alone or in a combination of two or more thereof.

Among them, in terms of the mechanical strength and productivity of the three-dimensional structure to be obtained and the storage stability of the curable ink, an ultraviolet curable resin (polymerizable compound) is particularly preferable.

As the ultraviolet curable resin (polymerizable compound), an ultraviolet curable resin in which addition polymerization or ring-opening polymerization is initiated by radicals or cations derived from a photopolymerization initiator by ultraviolet irradiation to form a polymer is preferably used. Examples of addition polymerization include radical polymerization, cationic polymerization, anionic polymerization, metathesis polymerization, and coordination polymerization. Further, examples of ring-opening polymerization include cationic polymerization, anionic polymerization, radical polymerization, metathesis polymerization, and coordination polymerization.

An example of the addition-polymerizable compound include a compound having at least one ethylenically unsaturated double bond. As the addition-polymerizable compound, a compound having at least one of terminal ethylenically unsaturated double bonds, and preferably, two or more thereof is preferably used.

The ethylenically unsaturated polymerizable compound has a chemical form of a monofunctional polymerizable compound, a multifunctional polymerizable compound, or a mixture thereof.

Examples of the monofunctional polymerizable compound include unsaturated carboxylic acids (for example, acrylic acid, methacrylic acid, itaconic acid, crotonic acid, isocrotonic acid, maleic acid, and the like), esters thereof, and amides thereof.

Examples of the multifunctional polymerizable compound include esters of unsaturated carboxylic acids and aliphatic polyalcohol compounds, and amides of unsaturated carboxylic acids and aliphatic amine compounds.

In addition, examples thereof include unsaturated carboxylic acid esters or amides having a nucleophilic substituent such as a hydroxyl group, an amino group, or mercapto group, isocyanates, addition reaction products of epoxies, dehydration condensation reaction products of carboxylic acids. Further, examples thereof include unsaturated carboxylic acid esters or amides having an electrophilic substituent such as an isocyanate group or an epoxy group, alcohols, and addition reaction products of amines and thiols. Moreover, examples thereof include unsaturated carboxylic acid esters or amides having a leaving substituent such as a halogen group or a tosyloxy group, alcohols, and substitution reaction products of amines or thiols.

Specific examples of the radical polymerizable compound, which is an ester of unsaturated carboxylic acid and an aliphatic polyalcohol compound, typically includes (meth)acylic esters. These (meth)acylic esters may be monofunctional (meth)acrylic esters or multifunctional (meth)acrylic esters.

Specific examples of monofunctional (meth)acrylates include tolyloxyethyl(meth)acrylate, phenyloxyethyl(meth)acrylate, cyclohexyl(meth)acrylate, ethyl(meth)acrylate, methyl(meth)acrylate, isobornyl(meth)acrylate, dipropyleneglycol di(meth)acrylate, tetrahydrofurfuryl(meth)acrylate, ethoxyethoxyethyl(meth)acrylate, (meth)acrylic acid 2-(2-vinyloxyethoxy)ethyl, 2-hydroxy-3-phenoxypropyl (meth)acrylate, 4-hydroxybutyl(meth)acrylate, and the like.

Specific examples of bifunctional (meth)acrylates include ethyleneglycol di(meth)acrylate, triethyleneglycol di(meth)acrylate, 1,3-butanediol di(meth)acrylate, tetramethyleneglycol di(meth)acrylate, propyleneglycol di(meth)acrylate, neopentylglycol di(meth)acrylate, hexanediol di(meth)acrylate, 1,4-cyclohexanediol di(meth)acrylate, tetraethyleneglycol di(meth)acrylate, pentaerythritol di(meth)acrylate, dipentaerythritol di(meth)acrylate, and the like.

Specific examples of trifunctional (meth)acrylates include trimethylolpropane tri(meth)acrylate, trimethylolethane tri(meth)acrylate, alkyleneoxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkyleneoxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, sorbitol tri(meth)acrylate, and the like.

Specific examples of tetrafunctional (meth)acrylates include pentaerythritol tetra(meth)acrylate, sorbitol tetra(meth)acrylate, ditrimethylolpropane tetra(meth)acrylate, dipentaerythritolpropionate tetra(meth)acrylate, ethoxylated pentaerythritol tetra(meth)acrylate, and the like.

Specific examples of pentafunctional (meth)acrylates include sorbitol penta(meth)acrylate, dipentaerythritol penta(meth)acrylate, and the like.

Specific examples of hexafunctional (meth)acrylates include dipentaerythritol hexa(meth)acrylate, sorbitol hexa(meth)acrylate, alkyleneoxide-modified hexa(meth)acrylate of phosphazene, caprolactone-modified dipentaerythritol hexa(meth)acrylate, and the like.

Examples of polyemizable compounds other than (meth)acrylates include itaconic acid esters, crotonic acid esters, isocrotonic acid esters, maleic acid esters, and the like.

Examples of itaconic acid esters include ethyleneglycol diitaconate, propyleneglycol diitaconate, 1,3-butanediol diitaconate, 1,4-butanediol diitaconate, tetramethyleneglycol diitaconate, pentaerythritol diitaconate, sorbitol tetraitaconate, and the like.

Examples of crotonic acid esters include ethyleneglycol dicrotonate, tetramethyleneglycol dicrotonate, pentaerythritol dicrotonate, sorbitol tetracrotonate, and the like.

Examples of isocrotonic acid esters include ethyleneglycol diisocrotonate, pentaerythritol diisocrotonate, sorbitol tetraisocrotonate, and the like.

Examples of maleic acid esters include ethyleneglycol dimaleate, triethyleneglycol dimaleate, pentaerythritol dimaleate, sorbitol tetramalate, and the like.

Examples of other esters include aliphatic alcohol-based esters disclosed in JP-B-46-27926, JP-B-51-47334, and JP-A-57-196231; esters having an aromatic skeleton disclosed in JP-A-59-5240, JP-A-59-5241, and JP-A-2-226149; and esters having an amino group disclosed in JP-A-1-165613.

Specific examples of monomers of amides of unsaturated carboxylic acids and aliphatic amide compounds include methylene bis-acrylamide, methylene bis-methacrylamide, 1,6-hexamethylene-bis-acrylamide, 1,6-hexamethylene-bis-methacrylamide, diethylenetriamine trisacrylamide, xylylene bis-acrylamide, xylylene bis-methacrylamide, (meth)acryloyl morpholine, and the like.

Examples of other preferable amide-based monomers include amide-based monomers having a cyclohexylene structure disclosed in JP-B-54-21726.

In addition, urethane-based addition-polymerizable compounds produced by the addition reaction of isocyanate and a hydroxyl group are also preferable, and a specific example thereof includes a vinyl urethane compound having two or more polymerizable vinyl groups in one molecule, which is produced by adding a hydroxyl-containing vinyl monomer represented by the following Formula (1) to a polyisocyanate compound having two or more isocyanate groups in one molecule disclosed in JP-B-48-41708.

$$CH_2=C(R^1)COOCH_2CH(R^2)OH \quad (1)$$

(Here, in Formula (1), $R^1$ and $R^2$ each independently represent H or $CH_3$.)

In the invention, a cationic ring-opening polymerizable compound having at least one cyclic ether group such as an epoxy group or an oxetane group in a molecule can be preferably used as the ultraviolet curable resin (polymerizable compound).

Examples of cationic polymerizable compounds include curable compounds containing a ring-opening polymerizable group. Among them, curable compounds containing a heterocyclic group are particularly preferable. Examples of these curable compounds include cyclic imino ethers such as epoxy derivatives, oxetane derivatives, tetrahydrofuran derivatives, cyclic lactone derivatives, cyclic carbonate derivatives, and oxazoline derivatives; and vinyl ethers. Among them, epoxy derivatives, oxetane derivatives, and vinyl ethers are preferable.

Preferred examples of epoxy derivatives include monofunctional glycidyl ethers, multifunctional glycidyl ethers, monofunctional alicyclic epoxies, and multifunctional alicyclic epoxies.

Specific examples of glycidyl ethers include diglycidyl ethers (for example, ethyleneglycol diglycidyl ether, bisphenol A diglycidyl ether, and the like), tri- or higher functional glycidyl ethers (for example, trimethylol ethane triglycidyl ether, trimethylolpropane triglycidyl ether, glycerol triglycidyl ether, triglycidyl trishydroxyethyl isocyanurate, and the like), tetra- or higher functional glycidyl ethers (for example, sorbitol tetraglycidyl ether, pentaerythritol tetraglycidyl ether, polyglycidyl ethers of cresol novolac resins, polyglycidyl ethers of phenol novolac resin, and the like), alicyclic epoxies (for example, CELLOXIDE 2021P, CELLOXIDE 2081, EPOLEAD GT-301, and EPOLEAD GT-401 (all are manufactured by Daicel Corporation)), EHPE (manufactured by Daicel Corporation), polycyclohexyl epoxymethyl ethers of phenol novolac resins, and oxetanes (for example, OX-SQ and PNOX-1009 (all are manufactured by Toagosei Co., Ltd.)).

As polymerizable compounds, alicyclic epoxy derivatives can be preferably used. The "alicyclic epoxy group" refers to a partial structure in which a double bond of a cycloalkene ring such as a cyclopentene group or a cyclohexene group is epoxidized with a suitable oxidizing agent such as hydrogen peroxide or peracid.

As alicyclic epoxy compounds, multifunctional alicyclic epoxies having two or more cyclohexene oxide groups or cyclopentene oxide groups in one molecule are preferable. Specific examples of alicyclic epoxy compounds include 4-vinyl cyclohexene dioxide, (3,4-epoxycyclohexyl)methyl-3,4-epoxycyclohexyl carboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

A general glycidyl compound having an epoxy group, having no alicyclic structure in a molecule, can be used independently or in the combination with the above alicyclic epoxy compound.

Examples of the general glycidyl compounds include glycidyl ether compounds and glycidyl ester compounds, but, preferably, a glycidyl ether compound is used the combination with the above alicyclic epoxy compound.

Specific examples of glycidyl ether compounds include aromatic glycidyl ether compounds such as 1,3-bis(2,3-epoxypropyloxy)benzene, bisphenol A type epoxy resins, bisphenol F type epoxy resins, phenol novolac epoxy resins, cresol novolac type epoxy resins, trisphenolmethane type epoxy resins; and aliphatic glycidyl ether compounds such as 1,4-butanediol glycidyl ether, glycerol triglycidyl ether, propyleneglycol diglycidyl ether, and trimethylolpropane triglycidyl ether. Examples of glycidyl esters include glycidyl esters of linolenic acid dimers.

As the polymerizable compound, a compound having an oxetanyl group (4-membered cyclic ether) (hereinafter, simply referred to as "oxetane compound") can be used. The compound having an oxetanyl group is a compound having one or more oxetanyl groups in one molecule.

Preferably, the curable ink contains one or two or more selected from the group consisting of 2-(2-vinyloxyethoxyl) ethyl(meth)acrylate, a polyether-based aliphatic urethane (meth)acrylate oligomer, 2-hydroxy-3-phenoxypropyl (meth)acrylate, and 4-hydroxybutyl(meth)acrylate. Thus, it is possible to cure the curing ink at a more suitable curing rate, and, particularly, it is possible to provide excellent productivity of the three-dimensional structure. Further, it is possible to improve the strength, durability and reliability of a three-dimensional structure.

Particularly, when the curable ink contains 2-(2-vinyloxyethoxyl)ethyl(meth)acrylate, curing can be conducted at low energy because it is less susceptible to oxygen inhibition. Further, copolymerization including other monomers is accelerated, and thus effects of increasing the strength of the three-dimensional structure can be obtained.

In addition, when the curable ink contains a polyether-based aliphatic urethane(meth)acrylate oligomer, effects of achieving both high strength and high toughness of the three-dimensional structure can be obtained.

Further, when the curable ink contains 2-hydroxy-3-phenoxypropyl(meth)acrylate, effects of improving flexibility and breaking elongation of the three-dimensional structure can be obtained.

Moreover, when the curable ink contains 4-hydroxybutyl (meth)acrylate, the adhesion of PMMA particles, PEMA particles, silica particles, or metal particles added to the self-cured product formed in the previous layer is improved, thereby obtaining the effect of increasing the strength of the three-dimensional structure.

When the curable ink contains the above-mentioned specific curing components, that is, one or two or more selected from the group consisting of 2-(2-vinyloxyethoxyl)ethyl (meth)acrylate, a polyether-based aliphatic urethane(meth) acrylate oligomer, 2-hydroxy-3-phenoxypropyl(meth)acrylate, and 4-hydroxybutyl(meth)acrylate, the ratio of the specific curing component to all of the curing components constituting the curable ink is preferably 80 mass % or more, more preferably 90 mass % or more, and still more preferably 100 mass %. Thus, the above-mentioned effects can be more remarkably exhibited.

The content of the curing component in the curable ink is preferably 80 mass % to 97 mass %, and more preferably 85 mass % to 95 mass %.

Thus, the mechanical strength of the three-dimensional structure to be finally obtained can be particularly excellent. Further, the productivity of the three-dimensional structure can be particularly excellent.

Polymerization Initiator

Preferably, the curable ink contains a polymerization initiator.

Thus, at the time of manufacturing a three-dimensional structure, it is possible to accelerate the curing rate of the curable ink, and, particularly, it is possible to provide excellent productivity of the three-dimensional structure.

As the polymerization initiator, a photo-radical polymerization initiator (aromatic ketones, acylphosphine oxide compounds, aromatic onium salt compounds, organic peroxides, thio compounds (thioxanthone compound, a thiophenyl group-containing compound, and the like), hexaarylbiimidazole compounds, ketoxime ester compounds, borate compounds, azinium compounds, metallocene compounds, active ester compounds, compounds having a carbon-halogen bond, alkyl amine compound, and the like) or a photo-cationic polymerization initiator can be used. Specific examples thereof include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chloro thioxanthone, 2-methyl-1-[4-(methylthio)phenyl]-2-morpholino-propan-1-one, bis(2,4,6-trimethyl benzoyl)-phenyl phosphine oxide, 2,4,6-trimethyl benzoyl-diphenyl-phosphine oxide, 2,4-diethyl thioxanthone, bis-(2,6-dimethoxy-benzoyl)-2,4,4-trimethylpentyl-phosphine oxide, and the like. They can be used alone or in a combination of two or more thereof.

Among them, it is preferable that the polymerization initiator constituting the curable ink contains bis(2,4,6-trimethylbenzoyl)-phenyl phosphineoxide, and 2,4,6-trimethyl benzoyl-diphenyl-phosphine oxide.

By containing this polymerization initiator, it is possible to cure the curing ink at a more suitable curing rate, and, particularly, it is possible to provide excellent productivity of the three-dimensional structure. Further, it is possible to improve the strength, durability and reliability of a three-dimensional structure.

The specific value of the content ratio of the polymerization initiator in the curable ink is preferably 3.0 mass % to 18 mass %, and more preferably 5.0 mass % to 15 mass %. Thus, it is possible to cure the curing ink at a more suitable curing rate, and, particularly, it is possible to provide excellent productivity of the three-dimensional structure. Further, it is possible to improve the strength, durability and reliability of a three-dimensional structure.

Hereinafter, a preferred example of the mixing ratio of curable resin and polymerization initiator in the curable ink (ink composition excluding the following "other components") is exemplified, but the composition of the curable ink in the invention is not limited thereto.

Example of Mixing Ratio 2-(2-vinyloxyethoxy)ethyl acrylate: 32 parts by mass
polyether-based aliphatic urethane acrylate oligomer: 10 parts by mass
2-hydroxy-3-phenoxypropyl acrylate: 13.75 parts by mass
dipropylene glycol diacrylate: 15 parts by mass
4-hydroxybutyl acrylate: 20 parts by mass
bis(2,4,6-trimethylbenzoyl)-phenyl-phosphine oxide: 5 parts by mass
2,4,6-trimethylbenzoyl-diphenyl-phosphine oxide: 4 parts by mass In the case of this mixing ratio, the above-mentioned effects are remarkably exhibited.

Other Components

The curable ink may contain other components in addition to the above-mentioned components.

Examples of these components include various colorants such as pigment and dyes; dispersants; surfactants; sensitizers; polymerization accelerators; solvents; penetration enhancers; wetting agents (humectants); fixing agents; antifungal agents; preservatives; antioxidants; UV absorbers; chelating agents; pH adjusting agents; thickeners; fillers; aggregation inhibitors; and defoamers.

Particularly, when the curable ink contains the colorant, it is possible to obtain a three-dimensional structure colored by a color corresponding to the color of the colorant.

Particularly, when the curable ink contains pigment as the colorant, it is possible to make the light resistance of the curable ink or the three-dimensional structure good. As the pigment, both inorganic pigments and organic pigments can be used.

Examples of inorganic pigments include carbon blacks (C.I. Pigment Black 7) such as furnace black, lamp black, acetylene black, and channel black; iron oxide; and titanium oxide. They can be used alone or in a combination of two or more thereof.

Among these inorganic pigments, in order to exhibit preferred white color, titanium oxide is preferable.

Examples of organic pigments include azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, quinophthalone pigments; dye chelates (for example, basic dye chelates, acidic dye chelates, and the like); staining lakes (basic dye lakes, acidic dye lakes); nitro pigments; nitroso pigments; aniline blacks; and daylight fluorescent pigments. They can be used alone or in a combination of two or more thereof.

More specifically, Examples of carbon black used as black pigment include No. 2300, No. 900, MCF88, No. 33, No. 40, No. 45, No. 52, MA7, MA8, MA100, and No. 2200B (all are manufactured by Mitsubishi Chemical Corporation); Raven 5750, Raven 5250, Raven 5000, Raven 3500, Raven 1255, and Raven 700 (all are manufactured by Carbon Columbia Co., Ltd.); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all are manufactured by CABOT JAPAN K.K.); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all are manufactured by Degussa Co., Ltd.).

Examples of white pigment include C.I. Pigment White 6, 18, and 21.

Examples of yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of red-violet (magenta) pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of blue (cyan) pigment include C.I. Pigment Blue 1, 2, 3, 15, 15:1, 15:2, 15:3, 15:34, 15:4, 16, 18, 22, 25, 60, 65, and 66; and C.I. Bat Blue 4 and 60.

Examples of pigments other than the above pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

When the curable ink contains a pigment, the average particle diameter of the pigment is preferably 300 nm or less, and more preferably 50 nm or more and 250 nm or less.

Thus, the discharge stability of the curable ink and the dispersion stability of the pigment in the curable ink can be particularly excellent, and images with better image quality can be formed.

Examples of dyes include acid dyes, direct dyes, reactive dyes, and basic dyes. They can be used alone or in a combination of two or more thereof.

Specific examples of dyes include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

When the curable ink contains a colorant, the content ratio of the colorant in the curable ink is preferably 1 mass % to 20 mass %. Thus, excellent hiding properties and color reproducibility are obtained.

Particularly, when the curable ink contains titanium oxide as the colorant, the content ratio of titanium oxide in the curable ink is preferably 12 mass % to 18 mass %, and more preferably 14 mass % to 16 mass %. Thus, particularly excellent hiding properties are obtained.

When the curable ink contains a dispersant in addition to a pigment, the dispesibility of the pigment can be further improved.

The dispersant is not particularly limited, but examples thereof include dispersants, such as polymer dispersant, generally used in preparing a pigment dispersion.

Specific examples of the polymer dispersants include polymer dispersants containing one or more of polyoxyalkylene polyalkylene polyamine, vinyl polymers and copolymers, acrylic polymers and copolymers, polyesters, polyamides, polyimides, polyurethanes, amino-based polymers, silicon-containing polymers, sulfur-containing polymers, fluorinated polymers, and epoxy resins, as main component.

Examples of commercially products of polymer dispersants include AJISPER series of Ajinomoto Fine-techno Co., Inc.; Solspers series (Solsperse 36000 and the like) commercially available from Noveon Corporation; DISPER-BYK series of BYK Japan K.K.; and DISPERBYK series of Kusumoto Chemicals, Ltd.

When the curable ink contains a surfactant, the abrasion resistance of the three-dimensional structure can be better.

The surfactant is not particularly limited, but examples thereof include silicone-based surfactants such as polyester-modified silicone, polyether-modified silicone, and the like. Among them, polyether-modified polydimethylsiloxane or polyester-modified polydimethylsiloxane is preferably used.

Specific examples of the surfactant include BYK-347, BYK-348, BYK-UV3500, 3510, 3530, and 3570 (all are trade names of BYK Japan K.K.).

The curable ink may contain a solvent.

Thus, the viscosity of the curable ink can be suitably adjusted, and the discharge stability of the curable ink by an ink jet method can be particularly excellent even when it contains a component having high viscosity.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetic acid esters, such as ethyl acetate, n-propyl acetate, iso-propyl acetate, n-butyl acetate, and iso-butyl acetate; aromatic hydrocarbons such as benzene, toluene, and xylene; ketones, such as methyl ethyl ketone, acetone, methyl isobutyl ketone, ethyl-n-butyl ketone, diisopropyl ketone, and acetylacetone; alcohols, such as ethanol, propanol, and butanol. They can be used alone or in a combination of two or more thereof.

The viscosity of the curable ink is preferably 10 mPa·s to 30 mPa·s, and more preferably 15 mPa·s to 25 mPa·s.

Thus, the discharge stability of the curable ink by an ink jet method can be particularly excellent. In the present specification, viscosity refers to a value measured at 25° C. using an E-type viscometer (VISCONIC ELD, manufactured by Tokyo Keiki Inc.).

Meanwhile, in the manufacture of the three-dimensional structure, several kinds of curable ink may be used.

For example, curable ink (color ink) containing a colorant and curable ink (clear ink) containing no colorant may be used.

Thus, for example, for the appearance of the three-dimensional structure, the curable ink containing a colorant can be used as a curable ink applied to the region influencing color tone, and, for the appearance of the three-dimensional structure, the curable ink containing no colorant can be used as a curable ink applied to the region not influencing color tone. It is advantageous in terms of reducing the production cost of the three-dimensional structure.

Further, in the three-dimensional structure to be finally obtained, several kinds of curable inks may be used in combination with each other such that the region (coating layer) formed using the curable ink containing no colorant is provided on the outer surface of the region formed using the curable ink containing a colorant. Thus, the change in color tone of the three-dimensional structure can be efficiently prevented and suppressed even when the surface of the three-dimensional structure is worn by long-term use.

For example, several kinds of curable inks containing colorants having different compositions from each other may be used.

Thus, a wider color reproducing area that can be expressed can be realized by the combination of these curable inks.

When the several kinds of curable inks are used, it is preferable that at least indigo-violet (cyan) curable ink, red-violet (magenta) curable ink, and yellow curable ink are used.

Thus, a wider color reproducing area that can be expressed can be realized by the combination of these curable inks.

Further, for example, the following effects are obtained by the combination of white curable ink and other colored curable ink.

That is, the three-dimensional structure to be finally obtained can have a first area on which white curable ink is applied, and a second area which is provided on the outside of the first area and on which curable ink having a color other than white color is applied. Thus, the first area on which white curable ink is applied can exhibit hiding properties, and the color saturation of the three-dimensional structure can be enhanced.

In addition, the above-mentioned effect of obtaining fine texture and the effect of enhancing the color saturation of the three-dimensional structure are synergistically operated, thereby making the aesthetic appearance (sensuousness) of the three-dimensional structure particularly excellent.

4. Three-Dimensional Structure

The three-dimensional structure of the invention can be manufactured using the above-mentioned method. Thus, it is possible to provide a three-dimensional structure manufactured with high dimensional accuracy.

Applications of the three-dimensional structure of the invention are not particularly limited, but examples thereof appreciated and exhibited objects such as dolls and figures; and medical instruments such as implants; and the like.

In addition, the three-dimensional structure of the invention may be applied to prototype, mass-produced products, made-to-order goods, and the like.

Further, the three-dimensional structure of the invention may be used as models (for example, models of vehicles such as automobiles, motorcycles, boats and airplanes, buildings, creatures such as animals and plants, natural materials (non-living materials) such as stone, and various foods).

Although preferred embodiments of the invention have been described, the invention is not limited thereto.

For example, in the method of manufacturing a three-dimensional structure according to the invention, if necessary, pre-treatment, intermediate treatment, and post-treatment processes may be performed.

An example of the pre-treatment process include a process of cleaning stage, and examples of the post-treatment process include a cleaning process, a shape adjustment process for deburring, an additional curing process for increasing the curing degree of a curable resin, and the like.

In addition, the invention may be applied to a powder lamination method (that is, a method of obtaining a three-dimensional structure as a laminate having a plurality of layers provided with a cured unit by forming a layer using powder, applying a curable ink onto the predetermined portion of the layer to form the cured unit and repeating this serial operations).

The entire disclosure of Japanese Patent Application No. 2014-063433, filed Mar. 26, 2014 is expressly incorporated by reference herein.

What is claimed is:

1. A three-dimensional structure manufacturing apparatus, in which the three-dimensional structure is manufactured by laminating layers, comprising:

a base unit on which the three-dimensional structure is to be formed;

a discharge unit which discharges a curable ink onto the base unit;

a flattening unit which flattens an ink layer composed of the curable ink discharged onto the base unit; and a curing unit which cures the ink layer, the flattening unit being configured to move in a thickness direction of the ink layer and a direction crossing the thickness direction of the ink layer.

2. The three-dimensional structure manufacturing apparatus according to claim 1, wherein the curing unit is an ultraviolet irradiation unit, and irradiates a contact area between the ink layer and the flattening unit with ultraviolet rays.

3. The three-dimensional structure manufacturing apparatus according to claim 1, wherein the flattening unit is a roller, and the curing unit is provided in the roller.

4. The three-dimensional structure manufacturing apparatus according to claim 1, wherein the curing unit is an ultraviolet irradiation unit, and a light shielding unit is provided between the curing unit and the discharge unit.

5. The three-dimensional structure manufacturing apparatus according to claim 4, wherein the light shielding unit includes an exhaust unit.

6. The three-dimensional structure manufacturing apparatus according to claim 1, further comprising:

an additional flattening unit which flattens an ink layer composed of the curable ink discharged onto the base unit; and an additional curing unit which cures the ink layer, wherein the flattening unit and the additional flattening unit are symmetrically arranged around the discharge unit, and the curing unit and the additional curing unit are symmetrically arranged around the discharge unit.

* * * * *